United States Patent
Wang et al.

(10) Patent No.: US 8,902,491 B2
(45) Date of Patent: Dec. 2, 2014

(54) ADDITIVE FOR IMPROVING OPTICAL PERFORMANCE OF AN ELECTROPHORETIC DISPLAY

(75) Inventors: Ming Wang, Union City, CA (US); Yu Li, Fremont, CA (US); Hui Du, Milpitas, CA (US); Xiaojia Wang, Fremont, CA (US); Haiyan Gu, Fremont, CA (US); Roman Ivanov, Milpitas, CA (US); Robert Sprague, Saratoga, CA (US)

(73) Assignee: E Ink California, LLC, Fremont, CA (US)

( * ) Notice: Subject to any disclaimer, the term of this patent is extended or adjusted under 35 U.S.C. 154(b) by 0 days.

(21) Appl. No.: 13/243,751

(22) Filed: Sep. 23, 2011

(65) Prior Publication Data

US 2013/0077155 A1    Mar. 28, 2013

(51) Int. Cl.
| | | |
|---|---|---|
| G02B 26/00 | (2006.01) |
| G03G 17/04 | (2006.01) |
| G09G 3/34 | (2006.01) |
| G02F 1/167 | (2006.01) |

(52) U.S. Cl.
CPC ........ *G02F 1/167* (2013.01); *G02F 2001/1678* (2013.01)
USPC .............................. 359/296; 430/32; 345/107

(58) Field of Classification Search
USPC ......... 359/237, 321, 242, 290–292, 295, 296, 359/298; 430/32, 34, 38, 45.5, 42.1, 46.1, 430/52; 345/107
See application file for complete search history.

(56) References Cited

U.S. PATENT DOCUMENTS

| | | | |
|---|---|---|---|
| 6,693,621 B1 | 2/2004 | Hayakawa et al. | |
| 6,930,818 B1 | 8/2005 | Liang et al. | |
| 7,116,467 B2 | 10/2006 | Kornbrekke et al. | |
| 7,170,670 B2 | 1/2007 | Webber | |
| 7,933,062 B2 * | 4/2011 | Masuzawa et al. | 359/296 |
| 8,462,423 B2 | 6/2013 | Farrand et al. | |
| 2004/0257635 A1 * | 12/2004 | Paolini et al. | 359/296 |
| 2006/0202949 A1 | 9/2006 | Danner et al. | |
| 2008/0237550 A1 * | 10/2008 | Yang et al. | 252/519.33 |
| 2012/0229885 A1 * | 9/2012 | Chen et al. | 359/296 |

FOREIGN PATENT DOCUMENTS

| | | |
|---|---|---|
| JP | 2000-231126 | 8/2000 |
| WO | WO 95/19227 | 7/1995 |
| WO | WO 98/41899 | 9/1998 |
| WO | WO 01/67170 | 9/2001 |

OTHER PUBLICATIONS

Allen, K. (Oct. 2003). Electrophoretics Fulfilled. *Emerging Displays Review: Emerging Display Technologies, Monthly Report—Oct. 2003*, 9-14.

Bardsley, J.N. & Pinnel, M.R. (Nov. 2004) Microcup™ Electrophoretic Displays. *USDC Flexible Display Report*, 3.1.2. pp. 3-12-3-16.

(Continued)

*Primary Examiner* — William Choi
*Assistant Examiner* — Brandi Thomas
(74) *Attorney, Agent, or Firm* — Perkins Coie LLP

(57) ABSTRACT

The present invention is directed to an electrophoretic fluid comprising uncharged or lightly charged neutral buoyancy particles. The resulting fluid can improve not only image stability but also contrast ratio of a display device, without significantly affecting the switching speed. The present invention is also directed to an electrophoretic display comprising display cells filled with the electrophoretic fluid.

21 Claims, 3 Drawing Sheets

(Invention)

(56) References Cited

OTHER PUBLICATIONS

Chaug, Y.S., Haubrich, J.E., Sereda, M. And Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.

Chen, S.M. (Jul. 2003) The Applications for the Revolutionary Electronic Paper Technology. *OPTO News & Letters*, 102, 37-41. (in Chinese, English abstract attached).

Chen, S.M. (May 2003) The New Application and the Dynamics of Companies. *TRI*. 1-10. (In Chinese, English abstract attached).

Chung, J., Hou, J., Wang, W., Chu, L.Y., Yao, W., & Liang, R.C. (Dec. 2003). Microcup® Electrophoretic Displays, Grayscale and Color Rendition. *IDW*, AMD2/EP1-2, 243-246.

Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.

Ho, C., & Liang, R.C. (Dec. 2003). *Microcup® Electronic Paper by Roll-to-Roll Manufacturing Processes*. Presentation conducted at FEG, Nei-Li, Taiwan.

Ho, Candice. (Feb. 1, 2005) *Microcupt® Electronic Paper Device and Application*. Presentation conducted at USDC 4th Annual Flexible Display Conference 2005.

Hou, J., Chen, Y., Li, Y., Weng, X., Li, H. And Pereira, C. (May 2004). Reliability and Performance of Flexible Electrophoretic Displays by Roll-to-Roll Manufacturing Processes. *SID Digest*, 32.3, 1066-1069.

Lee, H., & Liang, R.C. (Jun. 2003) SiPix Microcup® Electronic Paper—An Introduction. *Advanced Display*, Issue 37, 4-9 (in Chinese, English abstract attached).

Liang, R.C. (Feb. 2003) *Microcup® Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Displays/Electronic Paper—A Technology Overview*. Paper presented at the METS 2004 Conference in Taipie, Taiwan.

Liang, R.C., & Tseng, S. (Feb. 2003). *Microcup® LCD, A New Type of Dispersed LCD by A Roll-to-Roll Manufacturing Process*. Paper presented at the IDMC, Taipei, Taiwan.

Liang, R.C., (Feb. 2005) *Flexible and Roll-able Displays/Electronic Paper—A Brief Technology Overview*. Flexible Display Forum, 2005, Taiwan.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Chung, J., Wang, X., Pereira, C., & Chen, Y. (May 2003). Microcup® Active and Passive Matrix Electrophoretic Displays by A Roll-to-Roll Manufacturing Processes. *SID Digest*, vol. 34, Issue 1, pp. 838-841, 20.1.

Liang, R.C., Hou, J., Zang, H.M., & Chung, J. (Feb. 2003). *Passive Matrix Microcup® Electrophoretic Displays*. Paper presented at the IDMC, Taipei, Taiwan.

Liang, R.C., Hou, J., Zang, H.M., Chung, J., & Tseng, S. (Feb. 2003). Microcup® Displays: Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) << Format Flexible Microcup® Electronic Paper by Roll-to-Roll Manufacturing Process >>, Presentation conducted at the 14th FPD Manufacturing Technology Expo & Conference.

Nikkei Microdevices. (Dec. 2002) Newly-Developed Color Electronic Paper Promises—Unbeatable Production Efficiency. *Nikkei Microdevices*, p3. (in Japanese, with English translation).

Seigou Kawaguchi et al, (2000) Designed Monomers and Polymers, vol. 3, No. 3, pp. 263-277.

Sprague, R.A. (Sep. 23, 2009) SiPix Microcup Electrophoretic Epaper for Ebooks. *NIP 25*, 2009 pp. 460-462. (Presentation conducted on Sep. 23, 2009 at the 25th Int'l Conference on Digital Printing Technologies, Digital Fabrication 2009 (NIP 25) by Society for Imaging Science and Technology, in Louisville, Kentucky, USA.).

Wang, X., Kiluk, S., Chang, C., & Liang, R.C. (Feb. 2004). Mirocup® Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).

Wang, X., Li, P., Sodhi, D., Xu, T. and Bruner, S. et al., (Feb. 2006) *Inkjet Fabrication of Multi-Color Microcup® Electrophorectic Display*. The Flexible Microelectronics & Displays Conference of U.S. Display Consortium.

Wang, X., Zang, H.M. and Li, P. (Jun. 2006) Roll-to-Roll Manufacturing Process for Full Color Electrophoretic film. *SID Digest*, 00pp. 1587-1589.

Zang, H.M, Hwang, J.J., Gu, H., Hou, J., Weng, X., Chen, Y., et al. (Jan. 2004). Threshold and Grayscale Stability of Microcup® Electronic Paper. *Proceeding of SPIE-IS&T Electronic Imaging, SPIE* vol. 5289, 102-108.

Zang, H.M. & Hou, Jack, (Feb. 2005) *Flexible Microcup® EPD by RTR Process*. Presentation conducted at $2^{nd}$ Annual Paper-Like Displays Conference, Feb. 9-11, 2005, St. Pete Beach, Florida.

Zang, H.M. (Oct. 2003). *Microcup® Electronic Paper by Roll-to-Roll Manufacturing Processes*. Presentation conducted at the Advisory Board Meeting, Bowling Green State University, Ohio, USA.

Zang, H.M. (Feb. 2004). *Microcup Electronic Paper*. Presentation conducted at the Displays & Microelectronics Conference of U.S. Display Consortium, Phoenix, Arizona.

Zang, H.M. (Sep. 2006) *Monochrome and Area Color Microcup® EPDs by Roll-to-Roll Manufacturing Process*. Presentation conducted at the Fourth Organic Electronics Conference and Exhibition (OEC-06), Sep. 25-27, 2006, Frankfurt, Germany.

Zang, H.M. (Feb. 2007) *Developments in Microcup® Flexible Displays*. Presentation conducted at the 6th Annual Flexible Display and Microelectronics Conference, Phoenix, AZ Feb. 6-8.

Zang, H.M., & Liang, R.C. (2003) Microcup Electronic Paper by Roll-to-Roll Manufacturing Processes. *The Spectrum*, 16(2), 16-21.

Zang, H.M., Wang, F., Kang, Y.M., Chen, Y. and Lin, W. (Jul. 2007) *Microcupe® e-Paper for Embedded and Flexible Designs*. IDMC'07, Taipei International Convention Center, Taiwan.

Zang, H.M., Wang, W., Sun, C., Gu, H., and Chen, Y. (May 2006) Monochrome and Area Color Microcup® EPDs by Roll-to-Roll Manufacturing Processes. *ICIS' 06 International Congress of Imaging Science Final Program and Proceedings*, pp. 362-365.

Taiwan Patent Application No. 101134658, Taiwan Examination Report with a Search Report, dated Aug. 29, 2014.

\* cited by examiner

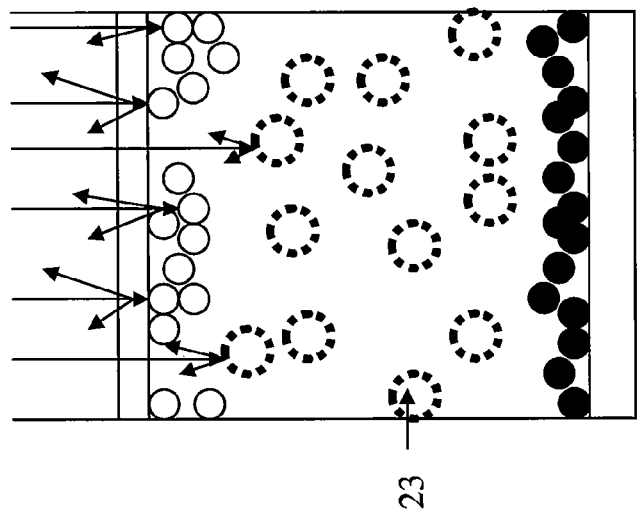
Figure 2b (Invention)
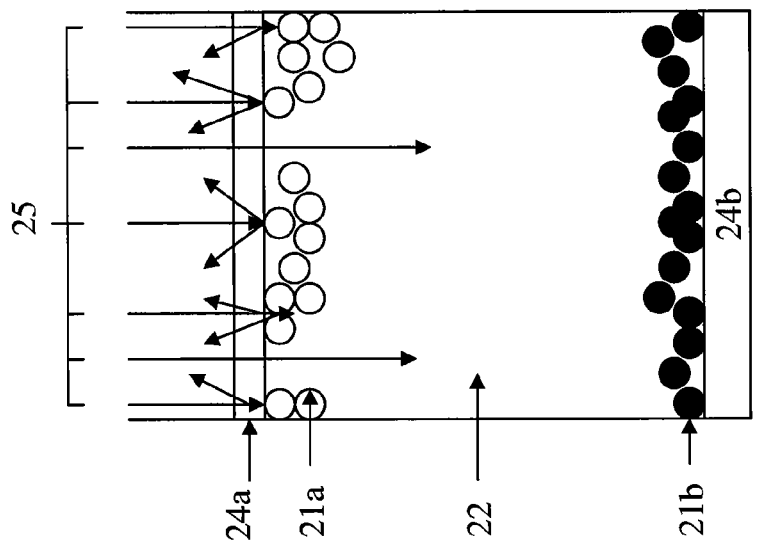
Figure 2a (Previous Configuration)

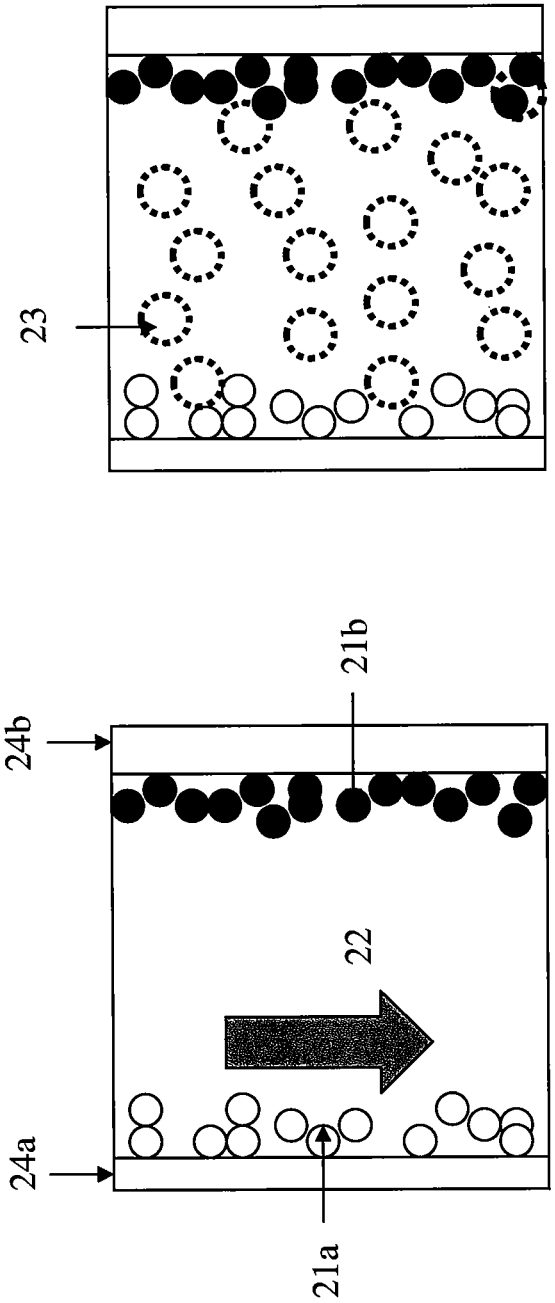

ADDITIVE FOR IMPROVING OPTICAL PERFORMANCE OF AN ELECTROPHORETIC DISPLAY

FIELD OF THE INVENTION

The present invention is directed to an electrophoretic fluid, in particular, an electrophoretic fluid comprising uncharged or lightly charged neutral buoyancy particles for improving optical performance of an electrophoretic display.

BACKGROUND OF THE INVENTION

An electrophoretic display (EPD) is a non-emissive device based on the electrophoresis phenomenon influencing charged pigment particles suspended in a dielectric solvent. An EPD typically comprises a pair of spaced-apart plate-like electrodes. At least one of the electrode plates, typically on the viewing side, is transparent. An electrophoretic fluid composed of a dielectric solvent with charged pigment particles dispersed therein is enclosed between the two electrode plates.

An electrophoretic fluid may have one type of charged pigment particles dispersed in a solvent or solvent mixture of a contrasting color. In this case, when a voltage difference is imposed between the two electrode plates, the pigment particles migrate by attraction to the plate of polarity opposite that of the pigment particles. Thus, the color showing at the transparent plate can be either the color of the solvent or the color of the pigment particles. Reversal of plate polarity will cause the particles to migrate to the opposite plate, thereby reversing the color.

Alternatively, an electrophoretic fluid may have two types of pigment particles of contrasting colors and carrying opposite charges and the two types of pigment particles are dispersed in a clear solvent or solvent mixture. In this case, when a voltage difference is imposed between the two electrode plates, the two types of pigment particles would move to opposite ends (top or bottom) in a display cell. Thus one of the colors of the two types of the pigment particles would be seen at the viewing side of the display cell.

For all types of the electrophoretic displays, the fluid contained within the individual display cells of the display is undoubtedly one of the most crucial parts of the device. The composition of the fluid determines, to a large extent, the lifetime, contrast ratio, switching rate and bistability of the device.

Prior to the present invention, it was proposed that the image stability of an electrophoretic display may be improved by adding a polymer additive into an electrophoretic fluid. The polymer additive is either completely dissolved in the fluid or partially dissolved in the fluid to form micelle aggregates. However the usefulness of this approach is limited because adding a polymer additive to the fluid would inevitably increase the viscosity of the fluid, resulting in an increase of the switching time.

BRIEF DESCRIPTION OF THE DRAWINGS

FIGS. 2a-2d show how the uncharged or lightly charged neutral buoyancy particles may improve the performance of an electrophoretic fluid which comprises two types of charged pigment particles.

SUMMARY OF THE PRESENT INVENTION

Figure 1:
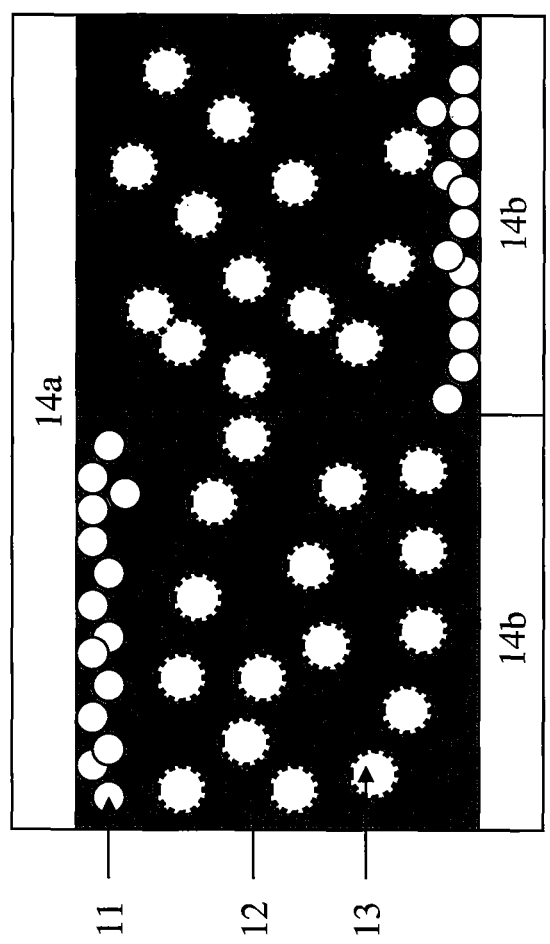
FIG. 1 depicts an electrophoretic fluid comprising one type of charged pigment particles and uncharged or lightly charged neutral buoyancy particles, both dispersed in a solvent or solvent mixture.

The first aspect of the present invention is directed to an electrophoretic fluid comprising charged pigment particles and uncharged or lightly charged neutral buoyancy particles in a solvent or solvent mixture.

In one embodiment, the fluid comprises two types of charged pigment particles of contrasting colors and carrying opposite charge polarities. In one embodiment, the two types of charged pigment particles are black and white, respectively. In one embodiment, the uncharged or lightly charged neutral buoyancy particles have the same color as one of the two types of charged pigment particles. In one embodiment, the uncharged or lightly charged neutral buoyancy particles have a color different from either one of the two types of charged pigment particles.

In one embodiment, the fluid comprises only one type of charged pigment particles.

The second aspect of the present invention is directed to an electrophoretic display comprising display cells which are filled with an electrophoretic fluid as described above. In one embodiment, the display cells are microcups. In another embodiment, the display cells are microcapsules.

In one embodiment, the lightly charged neutral buoyancy particles carry a charge which is less than 50%, preferably less than 25% and more preferably less than 10%, of the average charge carried by the positively or negatively charged pigment particles.

In one embodiment, uncharged or lightly charged neutral buoyancy particles are formed from a material selected from the group consisting of polyacrylate, polymethacrylate, polystyrene, polyaniline, polypyrrole, polyphenol and polysiloxane. In one embodiment, the uncharged or lightly charged neutral buoyancy particles are formed from a material selected from the group consisting of poly(pentabromophenyl methacrylate), poly(2-vinylnapthalene), poly(naphthyl methacrylate), poly(alpha-methystyrene), poly(N-benzyl methacrylamide) and poly(benzyl methacrylate).

In one embodiment, the uncharged or lightly charged neutral buoyancy particles are formed from a material having a refractive index different from that of the solvent or solvent mixture. In one embodiment, the uncharged or lightly charged neutral buoyancy particles are formed from a material having a refractive index higher than that of the solvent or solvent mixture.

In one embodiment, the uncharged or lightly charged neutral buoyancy particles are core-shell particles. In one embodiment, the core particle is formed from an organic or inorganic pigment. In one embodiment, the shell is formed from a material selected from the group consisting of polyacrylate, polymethacrylate, polystyrene, polyaniline, polypyrrole, polyphenol and polysiloxane. In one embodiment, the shell is formed from a material selected from the group consisting of poly(pentabromophenyl methacrylate), poly(2-vinylnapthalene), poly(naphthyl methacrylate), poly(alpha-methystyrene), poly(N-benzyl methacrylamide) and poly(benzyl methacrylate).

In one embodiment, the size of the uncharged or lightly charged neutral buoyancy particles is in the range of about 100 nanometers to about 5 microns.

In one embodiment, the concentration of the uncharged or lightly charged neutral buoyancy particles in an electrophoretic fluid is more than 2.5% by weight, but not exceeding about 25% by weight. In one embodiment, the concentration of the uncharged or lightly charged neutral buoyancy particles in an electrophoretic fluid is in a range between about 3% to about 15% by weight. In one embodiment, the concentration of the uncharged or lightly charged neutral buoyancy particles in an electrophoretic fluid is in a range between about 3% to about 10% by weight.

DETAILED DESCRIPTION OF THE INVENTION

The present inventors have discovered that by adding uncharged or lightly charged neutral buoyancy particles into an electrophoretic fluid, the display device can improve not only its image stability but also its contrast ratio, without significantly affecting its switching speed.

The term "lightly charged" is defined as having a charge which is less than 50%, preferably less than 25% and more preferably less than 10%, of the average charge carried by the positively charged pigment particles or negatively charged pigment particles.

The term "neutral buoyancy" refers to particles which do not rise or fall with gravity. In other words, the particles would float in the fluid between the two electrode plates. In one embodiment, the density of the neutral buoyancy particles may be the same as the density of the solvent or solvent mixture in which they are dispersed.

In one aspect of the present invention, an electrophoretic fluid comprises one type of charged pigment particles (11) and un-charged neutral buoyancy particles (13), both dispersed in a dielectric solvent or solvent mixture (12), as shown in FIG. 1 (i.e., "one particle system"). The charged pigment particles (11) would move to be at or near one of the electrodes (14a or 14b), depending on the voltage potential applied to the electrodes and the charge polarity carried by the charged pigment particles (11).

The charged pigment particles (11) may be formed from an inorganic pigment, such as $TiO_2$, $ZrO_2$, ZnO, $Al_2O_3$, Cl pigment black 26 or 28 or the like (e.g., manganese ferrite black spinel or copper chromite black spinel). They also may be formed from an organic pigment such as phthalocyanine blue, phthalocyanine green, diarylide yellow, diarylide AAOT yellow, and quinacridone, azo, rhodamine, perylene pigment series from Sun Chemical, Hansa yellow G particles from Kanto Chemical, and Carbon Lampblack from Fisher.

The charged pigment particles may also be particles coated with a polymer layer on their surface and the polymer coating can be prepared through various conventionally known polymerization techniques.

The charged pigment particles may carry a natural charge or are charged through the presence of a charge controlling agent.

The solvent or solvent mixture (12) in which the charged pigment particles are dispersed preferably has a low viscosity and a dielectric constant in the range of about 2 to about 30, preferably about 2 to about 15 for high particle mobility. Examples of suitable dielectric solvent include hydrocarbons such as isopar, decahydronaphthalene (DECALIN), 5-ethylidene-2-norbornene, fatty oils, paraffin oil; silicon fluids; aromatic hydrocarbons such as toluene, xylene, phenylxylylethane, dodecylbenzene and alkylnaphthalene; halogenated solvents such as perfluorodecalin, perfluorotoluene, perfluoroxylene, dichlorobenzotrifluoride, 3,4,5-trichlorobenzotri fluoride, chloropentafluoro-benzene, dichlorononane, pentachlorobenzene; and perfluorinated solvents such as FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoro-ethylene) such as Halocarbon Oils from Halocarbon Product Corp., River Edge, N.J., perfluoropolyalkylether such as Galden from Ausimont or Krytox Oils and Greases K-Fluid Series from DuPont, Del., polydimethylsiloxane based silicone oil from Dow-corning (DC-200). The solvent or solvent mixture may be colored by a dye or pigment.

The uncharged or lightly charged neutral buoyancy particles (13) may be formed from a polymeric material. The polymeric material may be a copolymer or a homopolymer.

Examples of the polymeric material for the uncharged or lightly charged neutral buoyancy particles may include, but are not limited to, polyacrylate, polymethacrylate, polystyrene, polyaniline, polypyrrole, polyphenol, polysiloxane or the like. More specific examples of the polymeric material may include, but are not limited to, poly(pentabromophenyl methacrylate), poly(2-vinylnapthalene), poly(naphthyl methacrylate), poly(alpha-methystyrene), poly(N-benzyl methacrylamide) or poly(benzyl methacrylate). These materials are suitable for the neutral buoyancy particles in the one particle system or the two particle system.

More preferably, the uncharged or lightly charged neutral buoyancy particles are formed from a polymer which is not soluble in the dielectric solvent of the display fluid, and also has a high refractive index. In one embodiment, the refractive index of the uncharged or lightly charged neutral buoyancy particles is different from that of the solvent or solvent mixture in which the particles are dispersed. However, typically the refractive index of the uncharged or lightly charged neutral buoyancy particles is higher than that of the solvent or solvent mixture. In some cases, the refractive index of the uncharged or lightly charged neutral buoyancy particles may be above 1.45.

In one embodiment, the materials for the uncharged or lightly charged neutral buoyancy particles may comprise an aromatic moiety.

The uncharged or lightly charged neutral buoyancy particles discussed above may be prepared from monomers through polymerization techniques, such as suspension polymerization, dispersion polymerization, seed polymerization, soap-free polymerization, emulsion polymerization or physical method, including inverse emulsification-evaporation process. The monomers are polymerized in the presence of a dispersant. The presence of the dispersant allows the polymer particles to be formed in a desired size range and the dispersant may also form a layer physically or chemically bonded to the surface of the polymer particles to prevent the particles from agglomeration.

The dispersants preferably has a long chain (of at least eight atoms), which may stabilize the polymer particles in a hydrocarbon solvent. Such dispersants may be an acrylate-terminated or vinyl-terminated macromolecule, which are suitable because the acrylate or vinyl group can co-polymerize with the monomer in the reaction medium.

One specific example of the dispersant is acrylate terminated polysiloxane (Gelest, MCR-M17, MCR-M22), Another type of suitable dispersants is polyethylene macromonomers, as shown below:

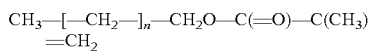

The backbone of the macromonomer may be a polyethylene chain and n may be 30-200. The synthesis of this type of macromonomers may be found in Seigou Kawaguchi et al, Designed Monomers and Polymers, 2000, 3, 263.

If the fluid system is fluorinated, the dispersants are then preferably also fluorinated.

Alternatively, the uncharged or lightly charged neutral buoyancy particles may also be formed from a core particle coated with a polymeric shell and the shell may be formed, for example, from any of the polymeric material identified above.

The core particle may be of an inorganic pigment such as $TiO_2$, $ZrO_2$, ZnO, $Al_2O_3$, CI pigment black 26 or 28 or the like (e.g., manganese ferrite black spinel or copper chromite black spinel), or an organic pigment such as phthalocyanine blue, phthalocyanine green, diarylide yellow, diarylide AAOT yellow, and quinacridone, azo, rhodamine, perylene pigment series from Sun Chemical, Hansa yellow G particles from Kanto Chemical, and Carbon Lampblack from Fisher or the like.

In the case of core-shell uncharged or lightly charged neutral buoyancy particles, they may be formed by a microencapsulation method, such as coacervation, interfacial polycondensation, interfacial cross-linking, in-suit polymerization or matrix polymerization.

The size of the uncharged or lightly charged neutral buoyancy particles is preferably in the range of about 100 nanometers to about 5 microns.

In another aspect of the invention as shown in FIG. 2, an electrophoretic fluid comprises two types of charged pigment particles (21a and 21b) and uncharged or lightly charged neutral buoyancy particles (23), all dispersed in a solvent or solvent mixture (22) (i.e., "two particle system"). The movement of the charged pigment particles is determined by the voltage potential applied to the electrodes 24a and 24b.

The two types of charged pigment particles have different optical characteristics. For example, they have contrasting colors and carry opposite charge polarities.

Each of the two types of the charged pigment particles may have the same characteristics discussed above for the charged particles in the one particle system. The solvent or solvent mixture in the two particle system may also be selected from the list given above.

The suitable materials for the uncharged or lightly charged neutral buoyancy particles are the same as those described above for the one particle system.

In an electrophoretic fluid comprising two types of charged pigment particles carrying opposite charge polarities and are of contrasting color, the particles preferably have a polymer layer on their surface to prevent them from sticking to each other. Otherwise, in the case of a black/white display device, the reflectance at the white and black states may suffer.

In one embodiment of this aspect of the present invention, the uncharged or lightly charged neutral buoyancy particles (23) added to the fluid may have a color substantially the same visually to the color of one of the two types of charged pigment particles. For example, in a display fluid, there may be charged black particles, charged white particles and uncharged or lightly charged neutral buoyancy particles and the uncharged or lightly charged neutral buoyancy particles may be either white or black.

In another embodiment, the uncharged or lightly charged neutral buoyancy particles may have a color substantially different from the color of either one of the two types of charged pigment particles.

FIGS. 2a & 2b show how the contrast ratio may be improved by the addition of the uncharged or lightly charged neutral buoyancy particles in a two particle system. As shown, the presence of the uncharged or lightly charged neutral buoyancy particles, especially if they are formed from a reflective material, increases reflection of the incident light (25); thus improving the contrast ratio.

FIGS. 2c & 2d show how the image stability may be improved by the addition of the uncharged or lightly charged neutral buoyancy particles in a two particle fluid system. The un-charged neutral buoyancy particles can fill in the gaps resulted from the charged pigment particles being over packed on the surface of an electrode under a driving electrical field, thus preventing the charged pigment particles from settling due to the gravitational force.

In addition, if the uncharged or lightly charged neutral buoyancy particles are white, they may enhance the reflectivity of the display. If they are black, they may enhance the blackness of the display.

In a further embodiment of the present invention, the concentration of the uncharged or lightly charged neutral buoyancy particles in an electrophoretic fluid is preferably more than 2.5% by weight, but not exceeding about 25% by weight. In another embodiment, the concentration of the uncharged or lightly charged neutral buoyancy particles is preferably in a range between about 3% to about 15% by weight and more preferably in a range between about 3% to about 10% by weight.

The term "about" refers to a range which is ±5% of the indicated value.

The electrophoretic fluid of the present invention, in addition to the uncharged or lightly charged neutral buoyancy particles, may also comprise other additives such as a charge controlling agent. The charge control agent (CCA) used in all embodiments of the present invention is compatible with the solvent in the electrophoretic fluid and may interact with the surface of the charged particles to effectively generate either positive or negative charge for the particles. Useful ionic charge control agents include, but are not limited to, sodium dodecylbenzenesulfonate, metal soap, polybutene succinimide, maleic anhydride copolymers, vinylpyridine copolymers, vinylpyrrolidone copolymer, (meth)acrylic acid copolymers or N,N-dimethylaminoethyl(meth)acrylate copolymers), Alcolec LV30 (soy lecithin), Petrostep B100 (petroleum sulfonate) or B70 (barium sulfonate), Solsperse 17000 (active polymeric dispersant), Solsperse 9000 (active polymeric dispersant), OLOA 11000 (succinimide ashless dispersant), OLOA 1200 (polyisobutylene succinimides), Unithox 750 (ethoxylates), Petronate L (sodium sulfonate), Disper BYK 101, 2095, 185, 116, 9077 & 220 and ANTI-TERRA series.

A further aspect of the present invention is directed to an electrophoretic display wherein display cells are filled with any of the display fluids as described in the present application.

The term "display cell" refers to a micro-container filled with a display fluid. A display cell may be a microcup as described in U.S. Pat. No. 6,930,818, the content of which is incorporated herein by reference in its entirety.

A display cell may also be any other micro-containers (e.g., microcapsules or microchannels), regardless of their shapes or sizes. All of these are within the scope of the present application, as long as the micro-containers are filled with a display fluid.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. An electrophoretic fluid comprising
    i) a first type of charged pigment particles which are white;
    ii) a second type of charged pigment particles which have a contrasting color and carry a charge polarity which is opposite of the charge polarity of the first type of charged pigment particles; and iii) uncharged or lightly charged neutral buoyancy particles, all three types of particles are dispersed in a solvent or solvent mixture, wherein the concentration of the uncharged or lightly charged neutral buoyancy particles in the electrophoretic fluid is more than 2.5% by weight, but not exceeding 25% by weight.

2. The fluid of claim 1, wherein the second type of charged pigment particles are black.

3. The fluid of claim 1, wherein the uncharged or lightly charged neutral buoyancy particles have the same color as one of the two types of charged pigment particles.

4. The fluid of claim 1, wherein the uncharged or lightly charged neutral buoyancy particles have a color different from either one of the two types of charged pigment particles.

5. The fluid of claim 1, wherein the lightly charged neutral buoyancy particles carry a charge which is less than 50% of the average charge carried by the first or second type of charged pigment particles.

6. The fluid of claim 1, wherein the lightly charged neutral buoyancy particles carry a charge which is less than 25% of the average charge carried by the first or second type of charged pigment particles.

7. The fluid of claim 1, wherein the lightly charged neutral buoyancy particles carry a charge which is less than 10% of the average charge carried by the first or second type of charged pigment particles.

8. The fluid of claim 1, wherein the uncharged or lightly charged neutral buoyancy particles are formed from a material selected from the group consisting of polyacrylate, polymethacrylate, polystyrene, polyaniline, polypyrrole, polyphenol and polysiloxane.

9. The fluid of claim 1, wherein the uncharged or lightly charged neutral buoyancy particles are formed from a material selected from the group consisting of poly(pentabromophenyl methacrylate), poly(2-vinylnapthalene), poly(naphthyl methacrylate), poly(alpha-methystyrene), poly(N-benzyl methacrylamide) and poly(benzyl methacrylate).

10. The fluid of claim 1, wherein the uncharged or lightly charged neutral buoyancy particles are formed from a material having a refractive index different from that of the solvent or solvent mixture.

11. The fluid of claim 1, wherein the uncharged or lightly charged neutral buoyancy particles are formed from a material having a refractive index higher than that of the solvent or solvent mixture.

12. The fluid of claim 1, wherein the uncharged or lightly charged neutral buoyancy particles are core-shell particles.

13. The fluid of claim 12, wherein the core particle is formed from an organic or inorganic pigment.

14. The fluid of claim 12, wherein the shell is formed from a material selected from the group consisting of polyacrylate, polymethacrylate, polystyrene, polyaniline, polypyrrole, polyphenol and polysiloxane.

15. The fluid of claim 12, wherein the shell is formed from a material selected from the group consisting of poly(pentabromophenyl methacrylate), poly(2-vinylnapthalene), poly(naphthyl methacrylate), poly(alpha-methystyrene), poly(N-benzyl methacrylamide), and poly(benzyl methacrylate).

16. The fluid of claim 1, wherein the size of the uncharged or lightly charged neutral buoyancy particles is in the range of about 100 nanometers to about 5 microns.

17. The fluid of claim 1, wherein the concentration of the uncharged or lightly charged neutral buoyancy particles in the electrophoretic fluid is in a range between 3% to 15% by weight.

18. The fluid of claim 1 wherein the concentration of the uncharged or lightly charged neutral buoyancy particles in the electrophoretic fluid is in a range between 3% to 10% by weight.

19. An electrophoretic display comprising display cells which are filled with an electrophoretic fluid of claim 1.

20. The display of claim 19, wherein the display cells are microcups.

21. The display of claim 19, wherein the display cells are microcapsules.

* * * * *